United States Patent
Morimoto et al.

(10) Patent No.: US 8,107,536 B2
(45) Date of Patent: Jan. 31, 2012

(54) VIDEO DECODER

(75) Inventors: Michiyo Morimoto, Fuchu (JP); Yuji Kawashima, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 169 days.

(21) Appl. No.: 12/703,023

(22) Filed: Feb. 9, 2010

(65) Prior Publication Data

US 2010/0316130 A1     Dec. 16, 2010

(30) Foreign Application Priority Data

Jun. 11, 2009   (JP) .................................. 2009-139934

(51) Int. Cl.
   *H04N 7/12* (2006.01)
(52) U.S. Cl. ............................... 375/240.24; 375/240.25
(58) Field of Classification Search .............. 375/240.24, 375/240.15, 240.13, 240.25
   See application file for complete search history.

(56) References Cited

U.S. PATENT DOCUMENTS

| | | | | |
|---|---|---|---|---|
| 7,924,925 | B2* | 4/2011 | He ............................ | 375/240.24 |
| 2005/0111547 | A1* | 5/2005 | Holcomb et al. ......... | 375/240.03 |
| 2007/0153900 | A1* | 7/2007 | Koto et al. ............... | 375/240.16 |
| 2007/0217500 | A1* | 9/2007 | Gao et al. ................. | 375/240.01 |
| 2008/0031356 | A1 | 2/2008 | Uchida et al. | |
| 2008/0267298 | A1 | 10/2008 | Morimoto et al. | |
| 2010/0054339 | A1* | 3/2010 | Schlanger et al. ........ | 375/240.25 |
| 2010/0166079 | A1* | 7/2010 | Goel ......................... | 375/240.25 |

FOREIGN PATENT DOCUMENTS

| | | |
|---|---|---|
| JP | 11-220694 | 8/1999 |
| JP | 2003-284077 | 10/2003 |
| JP | 2004-357205 | 12/2004 |
| JP | 2006-101405 | 4/2006 |
| JP | 2007-324923 | 12/2007 |
| JP | 2008-042566 | 2/2008 |
| JP | 2008-278210 | 11/2008 |

OTHER PUBLICATIONS

Japanese Patent Application No. 2009-139934, Notification of Reason for Refusal, mailed May 25, 2010. (English translation).

* cited by examiner

*Primary Examiner* — Jay Patel
*Assistant Examiner* — Jessica Prince
(74) *Attorney, Agent, or Firm* — Blakely, Sokoloff, Taylor & Zafman LLP

(57) ABSTRACT

A video decoder including: an input module configured to receive a video stream that is coded based on macroblocks; a frame determination module configured to determine whether or not a decoding subject image in the video stream that is input to the input module is a non-reference frame image that is not referred to when decoding another image; a slice analyzing module configured to determine, for each slice being configured by arranging the macroblocks, whether or not skip macroblocks each of which has no coding information of its own exist in a predetermined number or more when the frame determination module determines that the decoding subject image is a non-reference frame image; and a slice editing module configured to set, as skip macroblocks, all macroblocks in a slice for which the slice analyzing module determines that skip macroblocks exist in the predetermined number or more.

7 Claims, 7 Drawing Sheets

VIDEO DECODER

CROSS REFERENCE TO RELATED APPLICATION(S)

The present disclosure relates to the subject matters contained in Japanese Patent Application No. 2009-139934 filed on Jun. 11, 2009, which are incorporated herein by reference in its entirety.

FIELD

The present invention relates to a video stream decoding control technique that is suitably applied for example, a personal computer having a TV function for recording and reproducing digital broadcast program data.

BACKGROUND

Various electronic apparatus capable of handling a video image in the form of digital data are widely used nowadays. For example, if carrying a mobile electronic apparatus having a wireless network function, the user can view latest news images etc. even when the user is out or is moving. Furthermore, recently, personal computers having a TV function for viewing, recording, and reproducing digital TV broadcast data have became widely used.

Digital processing on a video image, that is, coding, transmission/reception, and decoding of a video image, imposes a heavy load on a processor and a network. In view of this, various schemes for reducing the load of digital processing on a video image have been proposed so far (refer to JP-A-2004-357205, for example).

In the publication, JP-A-2004-357205, when the transmission bandwidth is limited in stream delivery, image quality deterioration that is caused by decoding on the reception side is suppressed by giving higher priority to packets (corresponding to slices) having large coding information amounts per macroblock irrespective of the coding prediction method, selecting transmittable video packets from the video packets in each frame according to priority ranks, and sending them. In performing N-fold fast reproduction, fast reproduction frames are constructed and reproduced by selecting video packets that can be reproduced fast are selected according to packet priority ranks in both of P frames and B frames. Therefore, serious image quality deterioration occurs if coding information of an I frame (intrapicture predictive coding data) or a P frame as a reference frame is lost according to priority ranks. Furthermore, this conventional technique is associated with a problem that it cannot accommodate a case that necessary processing cannot be performed on the transmission side (coding side) as in the case of handling broadcast data because it is necessary to determine priority ranks on the decoding side and reconstruct data on the reception side.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

DETAILED DESCRIPTION OF THE EMBODIMENTS

An embodiment of the present invention will be hereinafter described with reference to FIGS. 1-7.

A configuration of a video decoder according to the embodiment of the invention will be described with reference to FIGS. 1 and 2. The video decoder according to the embodiment is configured to be a notebook personal computer 10.

The computer 10 has a function of reproducing a video stream that was compression-coded by a method that complies with the H.264 standard and, for example, is received over a network or read from a recording medium. This function is realized by, for example, a video decoder application program that is preinstalled in the computer 10.

Figure 1:
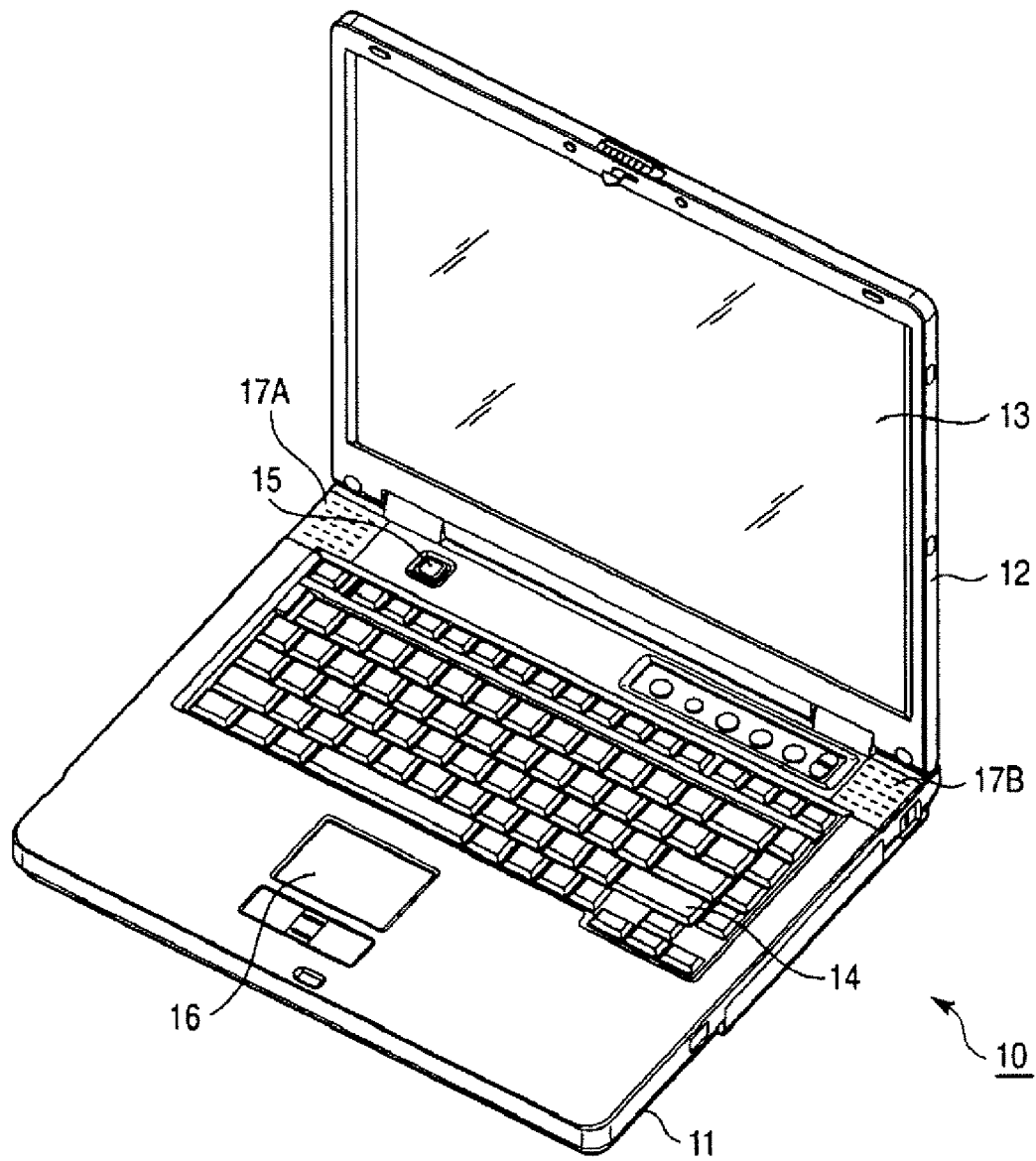
FIG. 1 is a perspective view showing an appearance of a video decoder according to an embodiment of the present invention.
Figure 2:
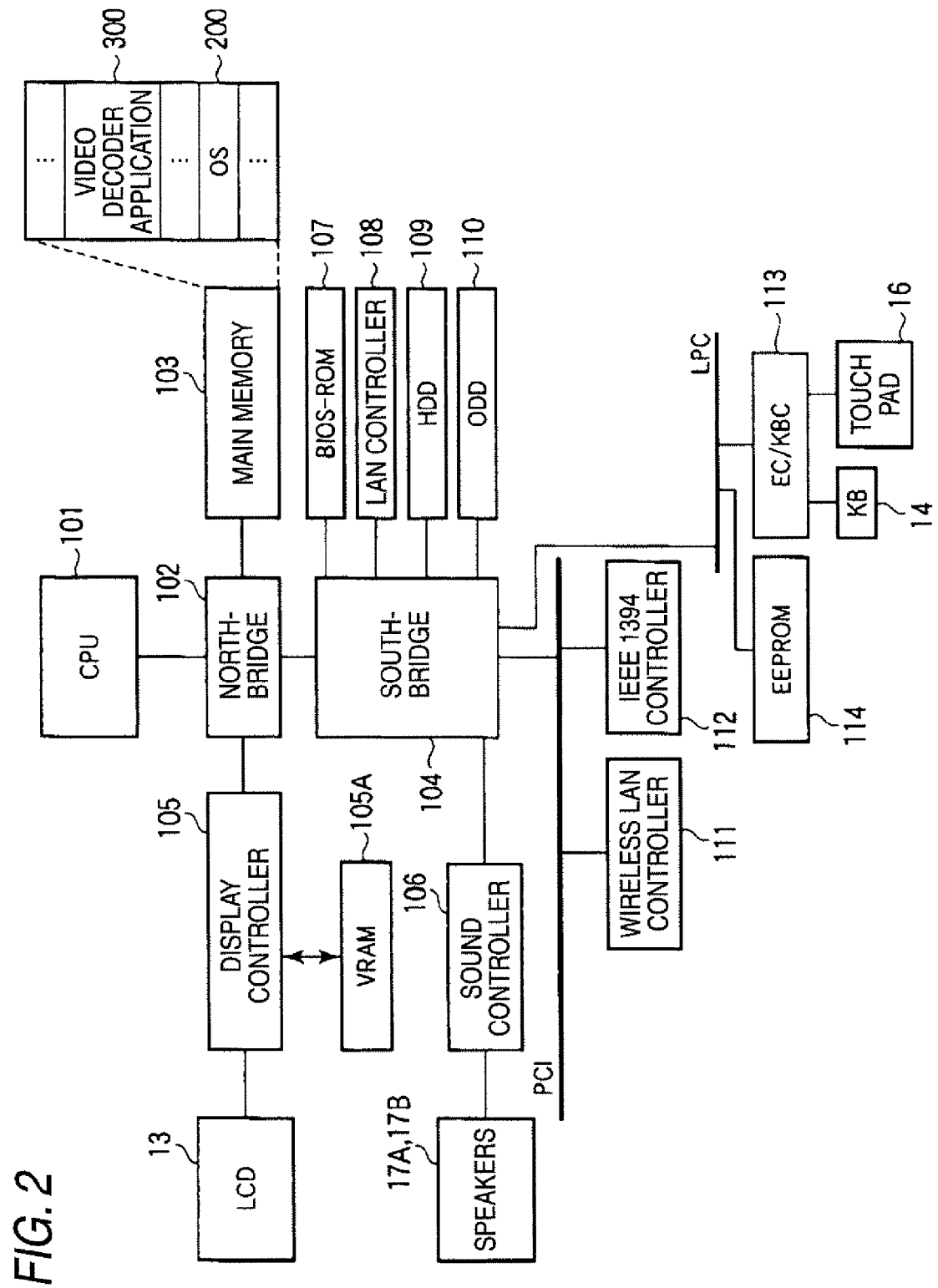
FIG. 2 shows an example system configuration of the is video decoder according to the embodiment.

FIG. 1 is a perspective view of the computer 10 in a state that a display unit 12 is opened. The computer 10 is composed of a main unit 11 and the display unit 12. An LCD (liquid crystal display) 13 is incorporated as a display device in the display unit 12.

The display unit 12 is attached to the main unit 11 so as to be rotatable between an open position where it exposes the top surface of the main unit 11 and a closed position where it covers the top surface of the main unit 11. The main unit 11 has a thin, box-shaped body, and a keyboard 14, a power button 15 for powering on/off the computer 10, a touch pad 16, speakers 17A and 17B, etc. are provided on the top surface of the main unit 11.

Next, a system configuration of the computer 10 will be described with reference to FIG. 2. As shown in FIG. 2, the computer 10 is equipped with a CPU 101, a northbridge 102, a main memory 103, a southbridge 104, a display controller 105, a video memory (VRAM) 105A, a sound controller 106, a BIOS-ROM 107, a LAN controller 108, an HDD (hard disk drive) 109, an ODD (optical disc drive) 110, a wireless LAN controller 111, an IEEE 1394 controller 112, an embedded controller/keyboard controller (EC/KBC) 113, an EEPROM 114, etc.

The CPU 101, which is a processor for controlling the operations of the computer 10, runs an operating system (OS) 200 and various application programs such as a video decoder application program 300 which operate under the OS 200. The OS 200 and the various application programs are loaded into the main memory 103 from the HDD 109. The video decoder application program 300 performs processing of reproducing a video stream that was compression-coded by a method that complies with the MPEG-2 standard and, for example, is received by the LAN controller 108 or the wireless LAN controller 111 over a network or read from a DVD (digital versatile disk) or the like by the ODD 110. The CPU 101 also runs a BIOS (basic input/output system) that is stored in the BIOS-ROM 107. The BIOS is a program for hardware control.

The northbridge 102 is a bridge device which connects a local bus of the CPU 101 to the southbridge 104. The northbridge 102 incorporates a memory controller for access-controlling the main memory 103. The northbridge 102 also has a function of communicating with the display controller 105 via, for example, a serial bus that complies with the PCI Express standard.

The display controller 105 is a device for controlling the LCD 13 which is used as a display monitor of the computer 10. A display signal is generated by the display controller 105 and supplied to the LCD 13.

The southbridge 104 controls individual devices on a PCI (peripheral component interconnect) bus and an LPC (low pin count) bus. The southbridge 104 incorporates an IDE (integrated drive electronics) controller for controlling the HOD 109 and the ODD 110. The southbridge 104 also has a function of communicating with the sound controller 106.

The sound controller 109, which is a sound source device, outputs reproduction subject audio data to the speakers 17A and 17B.

The wireless LAN controller 111 is a wireless communication device which performs a wireless communication according to the IEEE 802.11 standard, for example. The IEEE 1394 controller 112 communicates with an external apparatus via a serial bus that complies with the IEEE 1394 standard.

The EC/KBC 113 is a one-chip microcomputer in which an embedded controller for power management and a keyboard controller for controlling the keyboard (KB) 14 and the touch pad 16 are integrated together. The EC/KBC 113 has a function of powering on/off the computer 10 in response to a operation of the power button 15 by the user.

The video decoder application 300, which operates as one piece of software on the above-configured computer 10 on the same level as other application programs and serves to reproduce a video stream, has a mechanism for reducing the amount of processing that relates to reproduction of a video stream while suppressing image quality deterioration, irrespective of the load state of the CPU 101. This feature will be described below in detail.

Figure 3:
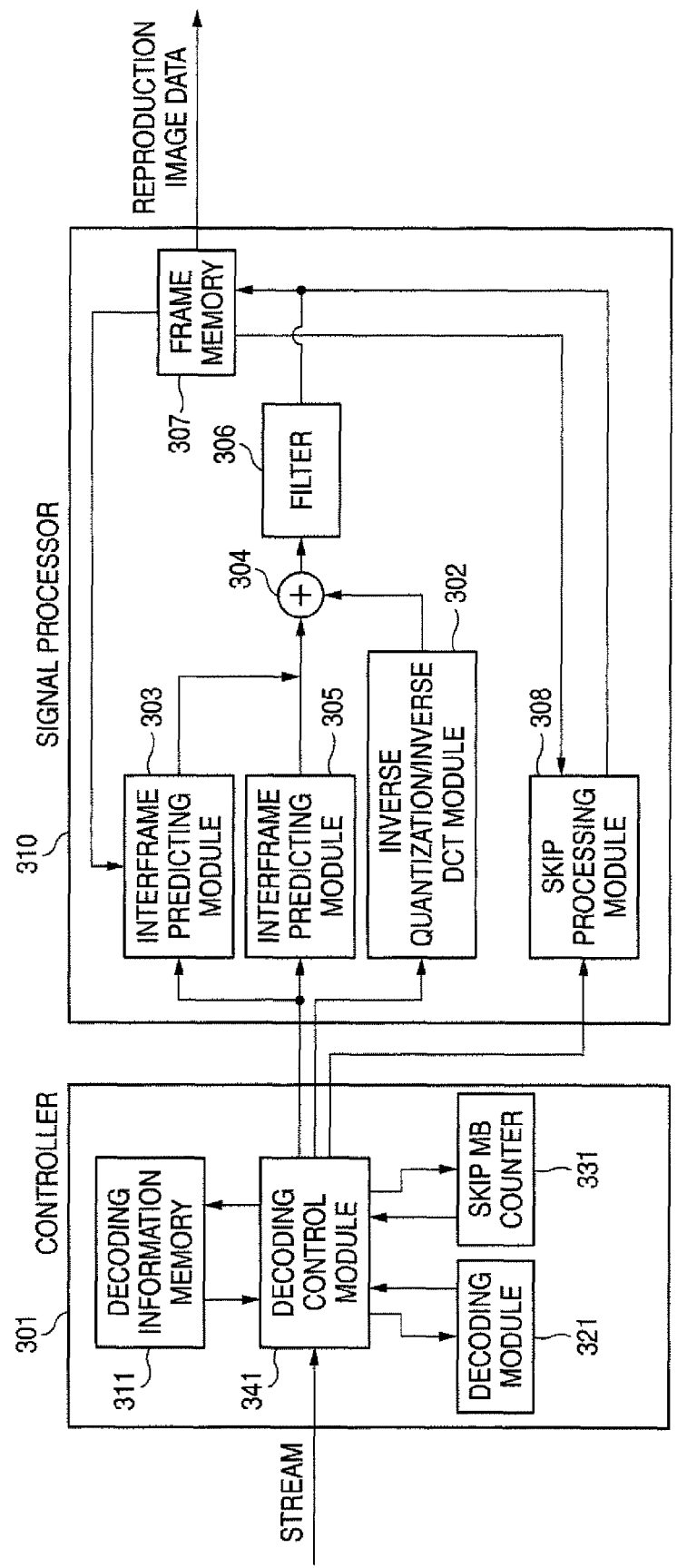
FIG. 3 is a block diagram showing a functional configuration of the video decoder according to the embodiment.

First, a functional configuration of a software decoder which is realized by the video decoder application 300 will be described with reference to a block diagram of FIG. 3.

Header information, slice information, macroblock (MB) information of an input video stream are decoded in a decoding data processor 301 (controller). The decoding data processor 301 is equipped with a memory 311 for decoding information including these three kinds of information, a decoding section 321 for performing a syntax analysis etc. using this information, a counter 331 for counting skip MBs, and a decoding control unit 341 for controlling the above components.

On the other hand, in a signal processor 310, inverse quantization/inverse DCT (discrete cosine transform) section 302 inverse-quantizes quantized coefficient information on the basis of quantization characteristic information and performs inverse quadrature transform on an inverse quantization result. A result is added to a past reproduction image by an adder 304 on the basis of motion vector information, and an addition result is stored in a reference image memory 307. At the same time, video is output using the image stored in the reference image memory 307. In this manner, video that is intended by the coding side can be output. For bidirectional prediction, the reference image memory 307 holds reference images of plural I and P frames. The signal processor 310 is also equipped with an interframe predicting section 303, an intraframe predicting section 305, a filter 306, and a skip processing section 308.

A description will be made of the I, P, and B frames. The I frame is an intraframe coding image and is a frame that can be decoded using its own information. The P frame is a predictive coding image (interframe forward predictive coding image) and is a frame that can be decoded by referring to information of an immediately preceding I frame. The B frame is a bidirectionally predictive coding image and is a frame that can be decoded by referring to information of preceding and following I and P frames. I, P, and B frames are arranged as follows: I, B, B, P, B, B, P, B, B, . . . I, B, B, P, B, B, . . . . Input/output is controlled while I and P frame before and after each set of two B frames (in the case of the above arrangement) are stored in the reference image memory 307.

That is, whereas information of an I and/or P frame is referred to in decoding another frame, information of a B frame is not referred to in decoding another frame. Therefore, first, the video decoder application program 300 employs B frames as candidates on which load reduction processing is to be performed. More specifically, the load reduction processing is prevented from affecting decoding of other frames.

Next, the background of load reduction processing that the video decoder application program 300 performs on P frames will be described with reference to FIGS. 4 and 5.

In a standard relating to H.264, each image is divided into macroblocks of 16×16 pixels and coding is performed on a macroblock-by-macroblock basis. One or more macroblocks (in the maximum case, all macroblocks of a frame) are combined into a slice. FIG. 4 is a conceptual diagram showing a relationship between an image (frame), slices, and macroblocks in a case that all macroblocks arranged in each row are combined into a slice.

Figure 4:
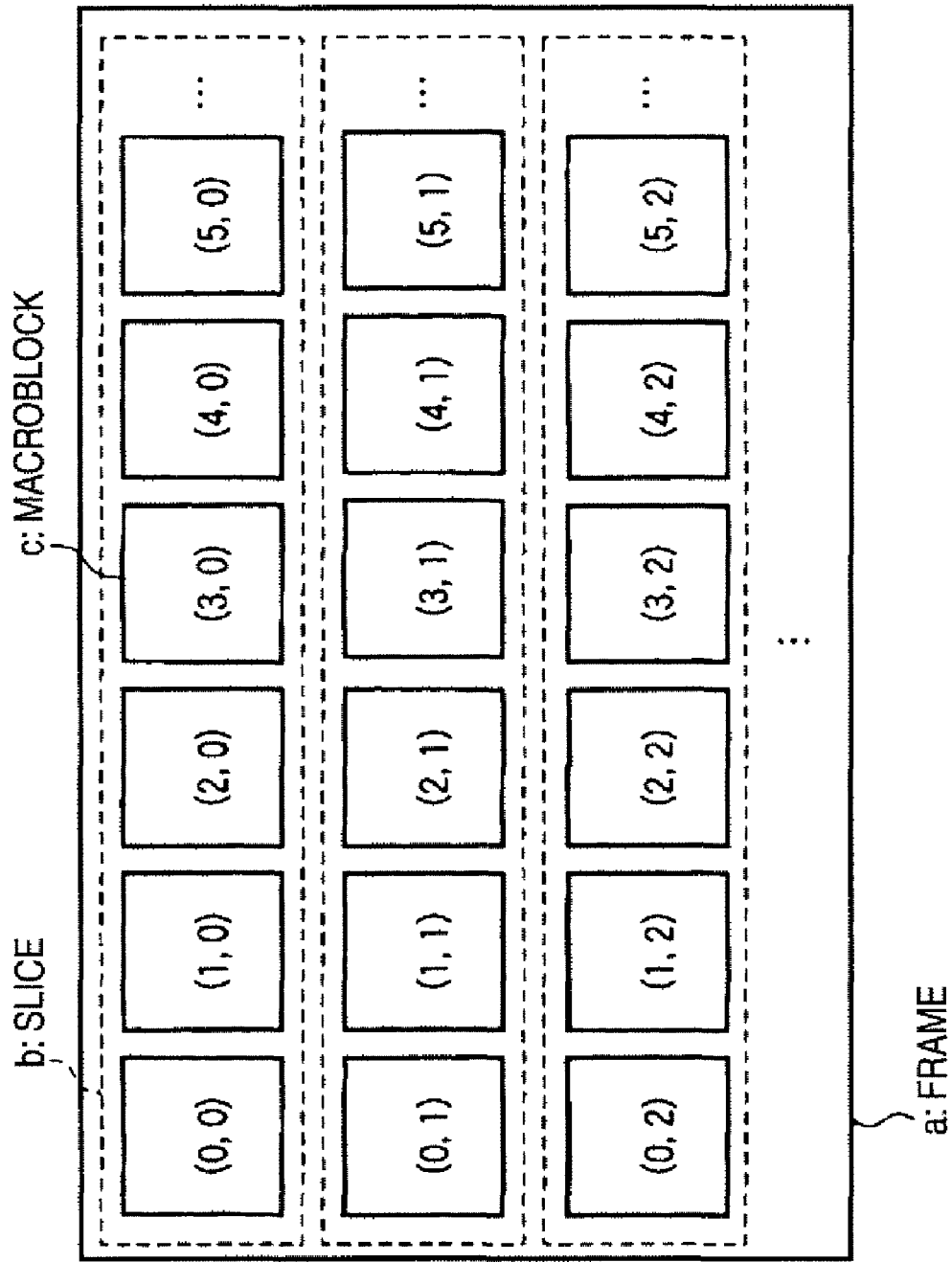
FIG. 4 is a conceptual diagram showing a relationship between a frame, slices, and macroblocks in a compression-coded video stream in the embodiment.

As shown in FIG. 4, each frame a is divided into plural slices b and each slice b consists of plural macroblocks c.

Figure 5:
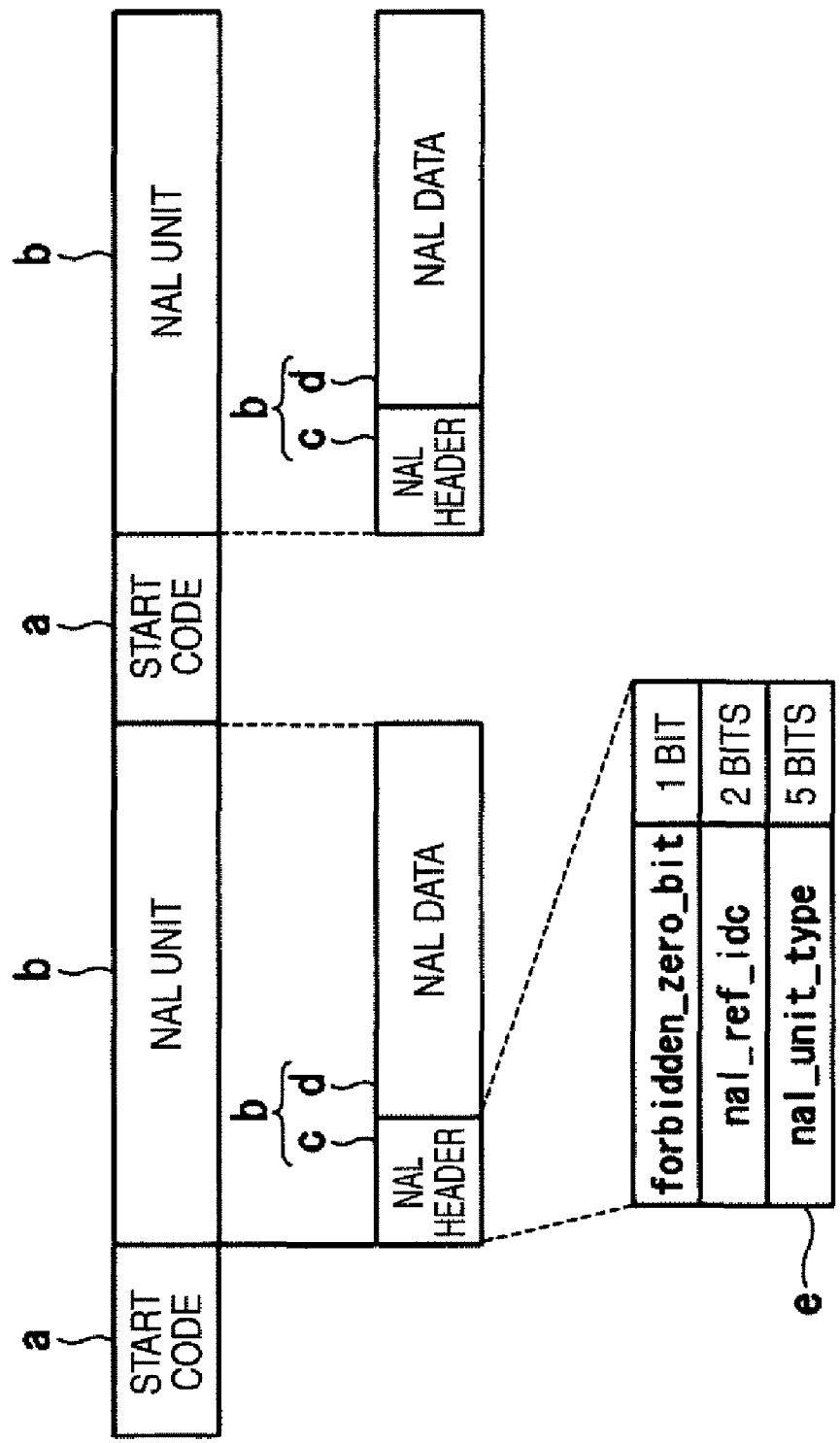
FIG. 5 shows header information of a NAL unit in H.264 which is used in the embodiment.

FIG. 5 shows the structure and header information of a NAL unit in H.264. As shown in FIG. 5, a coding image signal of H.264 is configured in such a manner that start codes a and packets called NAL units b are arranged alternately and continuously.

The start code a is a common code in this coding image signal and is fixed to "0x000001" (hexadecimal).

Each NAL unit b consists of a NAL header c and NAL data d which is a data body. The NAL header c contains parameters "forbidden_zero_bit," "nal_ref_idc," and "nal_unit_type," and the contents of the NAL data d is determined from the parameter "nal_unit_type" e (hereinafter referred to as a NAL type) which indicates a type of the NAL data d.

Figure 6:
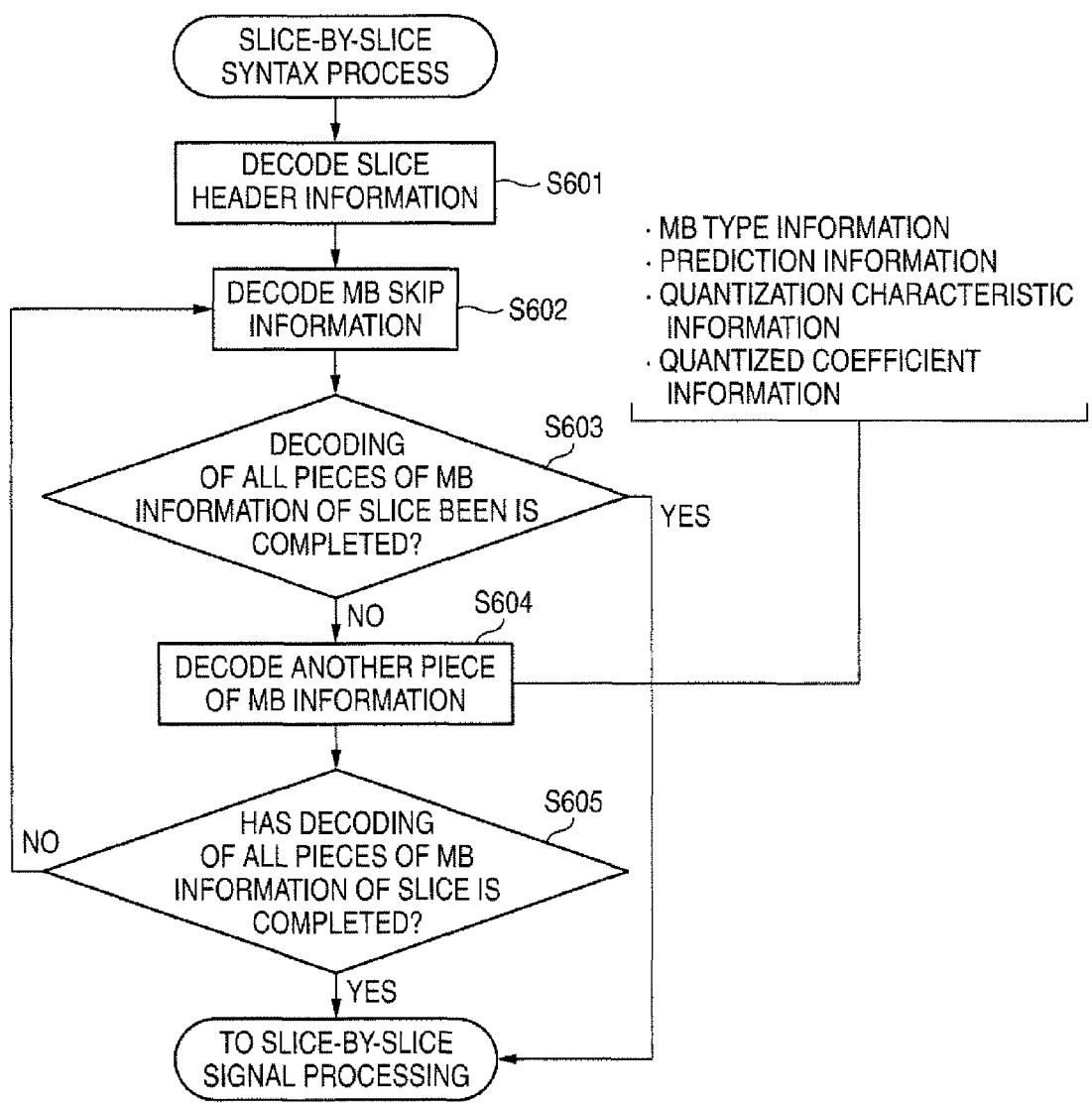
FIG. 6 is a flowchart of an ordinary slice-by-slice decoding process used in the embodiment.

FIG. 6 is a flowchart of an ordinary slice-by-slice decoding process which is executed by the decoding data processing section 301 (see FIG. 3) of the H.264 video decoder.

In a reference frame, slice information is decoded at step S601, MB skip information is decoded at step S602, and whether the decoding of all pieces of MB information of the slice has been completed is determined at step S603. If the decoding of all the pieces of MB information has not been completed yet, at step S604 another piece of MB information (MB type information, prediction information, quantization characteristic information, and quantized coefficient information) is decoded. It is again determined at step S605 whether the decoding of all the pieces of MB information has been completed. If the decoding of all the pieces of MB information has not been completed yet, at step S602 MB skip information is decoded again. After the decoding of all the pieces of MB information of the slice has been completed (S603: yes or S605: yes), the slice is subjected to signal processing.

Figure 7:
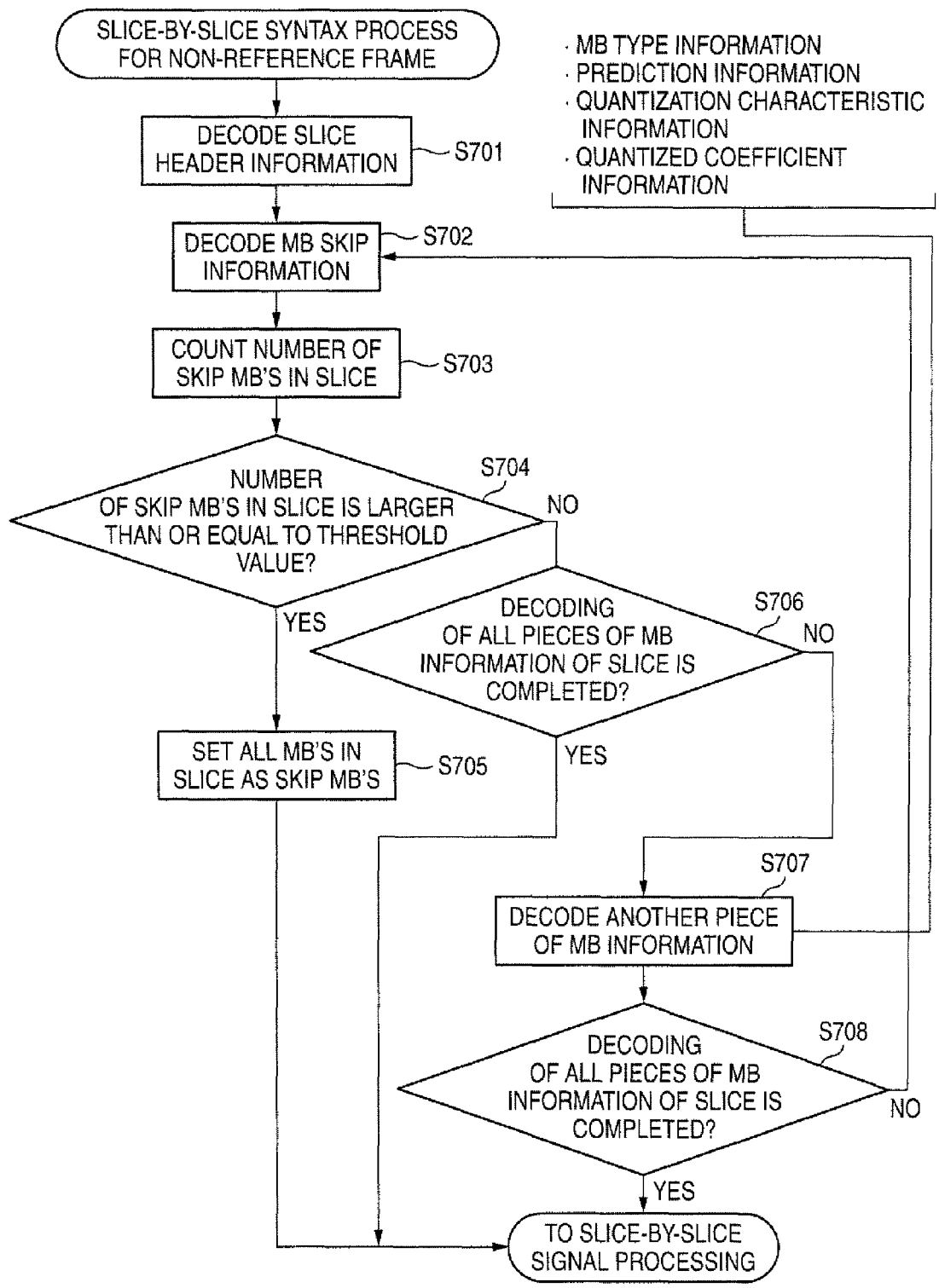
FIG. 7 is a flowchart of a slice-by-slice decoding process for a non-reference frame according to the embodiment.

FIG. 7 is a flowchart of a slice-by-slice decoding process for a non-reference frame according to the embodiment of the invention which is executed by the decoding data processing section 301 (see FIG. 3) of the H.264 video decoder. Part of this process is executed by the skip processing section 308.

A NAL header c is decoded by the decoding data processing section 301 of the H.264 video decoder, whereby a NAL type and whether the subject data is data of a reference frame becomes known. If "nal_ref_idc" of the NAL header c is "0," it becomes known that the subject frame is a frame that is not referred to (i.e., non-reference frame).

The slice-by-slice decoding process for a non-reference image according to the embodiment of the invention will be described below with reference to the flowchart of FIG. 7.

In a non-reference frame, slice information is decoded at step S701, MB skip information is decoded at step S702, and the number of skip MBs in the slice is counted at step S703. If the number of skip MBs in the slice is larger than or equal to a threshold value (e.g., 80% of the number of skip MBs in one slice) (S704: yes), all the MBs of the slice are set as skip MBs at step S705 and the slice is subjected to signal processing. If the number of skip MBs in the slice is smaller than the threshold value (S704: no), it is determined at step S706 whether the decoding of all pieces of MB information of the slice has been completed. If the decoding of all the pieces of MB information has not been completed yet, at step S707 another piece of MB information (MB type information, prediction information, quantization characteristic information, and quantized coefficient information) is decoded. It is again determined at step S708 whether the decoding of all the pieces of MB information has been completed. If the decoding of all the pieces of MB information has not been completed yet, at step S702 MB skip information is decoded again. After the decoding of all the pieces of MB information of the slice has been completed (S706: yes or S708: yes), the slice is subjected to signal processing.

When the number of skip MBs in a slice is larger than or equal to the threshold value, following MB information decoding data processing is not performed. The processing amount is thus reduced. Since all the MBs in the slice are processed as skip MBs, the amount of such signal processing as inverse quantization and DCT process can be reduced. Since this type of processing is limited to non-reference frames, the image quality deterioration can be made lower than in a case that ordinary decoding data processing and signal processing are performed.

As described above, the use of information of NAL headers c of an H.264 video stream makes it possible to apply the processing specific to the embodiment to even interframe-prediction-coded P frames if they are not referred to. Applying the processing specific to the embodiment to only non-reference frames and setting all MBs in a slice as skip MBs make it possible to reduce the amount of decoding processing and to suppress image quality deterioration.

Although the embodiment according to the present invention has been described above, the present invention is not limited to the above-mentioned embodiment but can be variously modified.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A video decoder comprising:
a processor; and
a memory coupled to the processor, the memory comprises the received video stream into 16×16 pixels blocks,
a frame determination module configured to determine whether or not a decoding subject image in the video stream that is input to the input module is a non-reference frame image that is not referred to when decoding another image,
a slice analyzing module configured to determine, for each slice configured by arranging the macroblocks, whether or not a predetermined number or more of skip macroblocks exist and each skip macroblock having no coding information, when the frame determination module determines that the decoding subject image is a non-reference frame image, and
a slice editing module configured to set, as skip macroblocks, all macroblocks in the slice when the slice analyzing module determines that the predetermined number or more of skip macroblocks exist in the slice.

2. The video decoder of claim 1,
wherein the input module is configured to receive the video stream that is coded by a method that complies with H.264 standard, and
wherein the frame determination module is configured to determine whether or not the decoding subject image is a non-reference frame.

3. The video decoder of claim 1,
wherein the slice analyzing module is configured to determine whether or not a ratio of the number of skip macroblocks to the number of all macroblocks of each slice is larger than or equal to a threshold value.

4. A method for simplifying a decoding process, the method comprising:
receiving a video stream that is coded based on macroblocks, each of the macroblocks being generated by dividing an image included in the video stream into 16×16 pixels blocks;
determining whether or not a decoding subject image in the received video stream is a non-reference frame image that is not referred to when decoding another image;
determining, for each slice being configured by arranging the macroblocks, whether or not a predetermined number or more of skip macroblocks exist, each skip macroblock having no coding information, determined that the decoding subject image is a non-reference frame image; and
setting, as skip macroblocks, all macroblocks in the slice, when determined that the predetermined number or more of skip macroblocks exist in the slice.

5. A video decoder comprising:
An input hardware module configured to receive a video stream that is coded based on macroblocks, each of the macroblocks being generated by dividing an image included in the received video stream into 16×16 pixel blocks;
a frame determination hardware module configured to determine whether or not a decoding subject image in the video stream that is input to the input module is a non-reference frame image that is not referred to when decoding another image;
a slice analyzing hardware module configured to determine, for each slice configured by arranging the macroblocks, whether or not a predetermined number or more of skip macroblocks exist and each skip macroblock having no coding information, when the frame determination module determines that the decoding subject image is a non-reference frame image;

and a slice editing hardware module configured to set, as skip macroblocks, all macroblocks in the slice when the slice analyzing module determines that the predetermined number or more of skip macroblocks exist in the slice.

6. The video decoder of claim 5, wherein the input hardware module is configured to receive the video stream that is coded by a method that complies with H.264 standard, and wherein the frame determination hardware module is configured to determine whether or not the decoding subject image is a non-reference frame.

7. The video decoder of claim 5, wherein the slice analyzing hardware module is configured to determine whether or not a ratio of the number of skip macroblocks to the number of all macroblocks of each slice is larger than or equal to a threshold.

* * * * *